US011203417B2

(12) United States Patent
Honnorat et al.

(10) Patent No.: US 11,203,417 B2
(45) Date of Patent: Dec. 21, 2021

(54) ROTORCRAFT FITTED WITH AN ANTIVIBRATION SYSTEM, AND A METHOD OF ADJUSTING SUCH AN ANTIVIBRATION SYSTEM

(71) Applicant: AIRBUS HELICOPTERS, Marignane (FR)

(72) Inventors: Olivier Honnorat, Aix en Provence (FR); Francois Malburet, Coudoux (FR)

(73) Assignee: AIRBUS HELICOPTERS, Marignane (FR)

( * ) Notice: Subject to any disclaimer, the term of this patent is extended or adjusted under 35 U.S.C. 154(b) by 549 days.

(21) Appl. No.: 15/922,391

(22) Filed: Mar. 15, 2018

(65) Prior Publication Data

US 2018/0265188 A1 Sep. 20, 2018

(30) Foreign Application Priority Data

Mar. 20, 2017 (FR) ...................... 1770266

(51) Int. Cl.
*B64C 27/00* (2006.01)
*F16F 15/14* (2006.01)
*F16F 7/10* (2006.01)

(52) U.S. Cl.
CPC .......... *B64C 27/001* (2013.01); *F16F 7/1011* (2013.01); *F16F 15/14* (2013.01); *B64C 2027/002* (2013.01); *B64C 2027/004* (2013.01); *B64C 2027/005* (2013.01)

(58) Field of Classification Search
CPC ............ B64C 27/001; B64C 2027/002; B64C 2027/004; B64C 2027/005; F16F 7/10; F16F 7/104; F16F 7/1005
See application file for complete search history.

(56) References Cited

U.S. PATENT DOCUMENTS

| 4,405,101 A | 9/1983 | Carlson et al. |
| 4,431,148 A | 2/1984 | Mouille |
| 5,813,626 A * | 9/1998 | Zoppitelli ............. B64C 27/001 244/17.13 |

(Continued)

FOREIGN PATENT DOCUMENTS

| EP | 1031136 A2 | 8/2000 |
| EP | 2527250 A1 | 11/2012 |

(Continued)

OTHER PUBLICATIONS

French Search Report for French Application No. FR 1770266, Completed by the French Patent Office, dated Sep. 25, 2017, 8 pages.

*Primary Examiner* — Nicholas McFall
(74) *Attorney, Agent, or Firm* — Brooks Kushman P.C.

(57) ABSTRACT

A rotorcraft having an antivibration system, the antivibration system being arranged at the interface between a fuselage of the rotorcraft and a casing of a main power transmission gearbox, or "MGB", in order to transmit rotary motion generated by an engine of the rotorcraft to a main rotor providing the rotorcraft at least with lift, and possibly also propulsion, the antivibration system including calculation means for analyzing as a function of time the dynamic excitation and the resulting vibration transmitted to the fuselage of the rotorcraft.

20 Claims, 4 Drawing Sheets

(56) References Cited

U.S. PATENT DOCUMENTS

| | | | |
|---|---|---|---|
| 6,176,136 B1 | 1/2001 | Zoppitelli et al. | |
| 6,224,014 B1 | 5/2001 | Dussac | |
| 6,283,408 B1* | 9/2001 | Ferullo | B64C 27/001 |
| | | | 244/17.27 |
| 8,888,037 B2 | 11/2014 | Pula et al. | |
| 8,985,502 B2 | 3/2015 | Krysinski et al. | |
| 2002/0128072 A1 | 9/2002 | Terpay et al. | |
| 2004/0050999 A1* | 3/2004 | Hill | G05D 19/02 |
| | | | 244/17.27 |
| 2015/0069173 A1 | 3/2015 | Cranga et al. | |
| 2018/0053358 A1* | 2/2018 | Hale | B64C 27/12 |

FOREIGN PATENT DOCUMENTS

| | | |
|---|---|---|
| EP | 2594481 A1 | 5/2013 |
| EP | 2845799 A1 | 3/2015 |
| FR | 2492933 A1 | 4/1982 |
| FR | 2499505 A1 | 8/1982 |
| FR | 2747098 A1 | 10/1997 |
| FR | 2769396 A1 | 4/1999 |
| FR | 2772125 A1 | 6/1999 |
| FR | 2787762 A1 | 6/2000 |
| WO | 2016022672 A1 | 2/2016 |

\* cited by examiner

ROTORCRAFT FITTED WITH AN ANTIVIBRATION SYSTEM, AND A METHOD OF ADJUSTING SUCH AN ANTIVIBRATION SYSTEM

CROSS-REFERENCE TO RELATED APPLICATIONS

This application claims priority to French patent application No. FR 1770266 filed on Mar. 20, 2017, the disclosure of which is incorporated in its entirety by reference herein.

BACKGROUND OF THE INVENTION

(1) Field of the Invention

The present invention relates to the field of rotorcraft, and more particularly to damping vibration caused by the rotary dynamic assembly comprising a main rotor and a main power transmission gearbox (MGB) in which the gearing is driven in rotation by at least one engine of the rotorcraft.

2) Description of Related Art

During rotation of the rotary dynamic assembly, dynamic excitation is generated by the rotor and is transmitted to the fuselage of the rotorcraft. The resulting vibration is then a source of fatigue for the materials and the equipment, and also a source of discomfort for the crew and the passengers of the rotorcraft.

Specifically, it should be recalled that the torsor of the mechanical actions is made up of a static portion coming from flight "forces", and a dynamic portion given by the dynamic excitation induced by the rotor on the fuselage. As a result, the connection between the MGB and the fuselage of a rotorcraft needs to satisfy two targets:

pass the static mechanical actions necessary for providing lift for the rotorcraft fuselage in various stages of flight; and filtering the dynamic actions coming from the rotor in order to provide acceptable flight comfort and sufficient fatigue strength.

In general manner, in order to limit such dynamic excitation to which the fuselage of the rotorcraft is subjected, and indeed in order to eliminate it, it is known to fit the mechanical connection between the MGB and the fuselage with a system of the integrated-bar antiresonance isolation system type commonly referred to by its French acronym: SARIB.

For this purpose, a rotorcraft of conventional type includes in known manner a set of N bars referred to as "MGB bars"; each bar has a high portion fastened to the top portion of the MGB casing and has a bottom portion hinged to an MGB bar suspension member serving to support the rotary dynamic assembly combined with a system of N independent antiresonance systems, referred to below as "resonators", each of the bars thus being connected to a respective resonator.

Furthermore, each resonator is generally made up of:

a tuned-mass damper associated with a respective MGB bar and comprising a mass support secured at one of its ends to a suspension member and provided at its other end with an inertial mass, the damper being characterized by inertia that is obtained for the most part by said inertial mass and being excited by the corresponding MGB bar; and a suspension member including resilient return means such as a spring characterized by an appropriate stiffness, working in traction/compression, or indeed in twisting, connecting the bottom portion of the MGB to the fuselage in such a manner that the inner end of the suspension member is fastened to the bottom portion of the MGB and its outer end is hinged to the fuselage.

In addition, there exist various types of SARIB suspensions having suspension members of different kinds. Nevertheless, the mechanical operation of those various suspension members is similar, since they serve respectively to obtain the same result, namely "flexibility" in the suspension connection in a direction parallel to the axis of rotation of the main rotor of the rotorcraft.

Thus, in a first example of a suspension member, it may comprise at least one flexible blade that may be flexible for vertical, roll, and pitching movements but very rigid for yaw, and also longitudinal and lateral horizontal movements. In this first example, the damper is secured to a rigid portion of said flexible blade. In addition, such a first example of a suspension member with flexible blades is described in particular by the Applicant in Documents FR 2 499 505 and FR 2 747 098.

Furthermore, in a second example of a suspension member, the above-described flexible blades may be replaced by rigid arms and springs that work in twisting and that are arranged respectively at a pivot connection between one end of each of the rigid arms and the fuselage of the rotorcraft. That second example of a suspension member is described in particular by the Applicant in Document FR 2 787 762.

In both situations, the SARIB suspension has three degrees of freedom. Specifically, the MGB can move only vertically, in roll, and in pitching: with potential for the MGB to perform longitudinal or lateral horizontal movement being prevented at the bottom of the MGB by a diaphragm that serves to take up the reaction torque from the main rotor.

The principle of the SARIB suspension is to create antiresonance by superposing the inertial effects of the damper on the return forces generated by the resilient return means for the purpose of diminishing or even eliminating the dynamic excitation. For this purpose, it is necessary to adapt the values of the mass and the position of the inertial mass of the damper and also the values of the stiffness of the resilient return means so that the antiresonance frequency of the SARIB suspension corresponds to the frequency of the dynamic excitation transmitted to the fuselage of the rotorcraft by the rotary dynamic assembly via the MGB bars.

Whatever the origin of the dynamic excitation, with a rotor that is well balanced, the fuselage vibrates at frequencies that are harmonics that can be written $kb\Omega$, where $k$ is an integer, $b$ is the number of blades of the main rotor, and $\Omega$ is the frequency of the rotary motion of the main rotor.

In most circumstances, the dynamic excitation at the first harmonic $b\Omega$, is preponderant. After adjusting the mass and the position of said inertial mass, and also after adjusting the stiffness of the resilient return means of the suspension member, the transfer function of the SARIB suspension, when optimally adjusted, then causes antiresonance to appear that is used for attenuating, and if possible eliminating, the dynamic excitation. The antiresonance frequency is then generally equal to $b\Omega$, as explained above.

Nevertheless, the adjustments of a SARIB suspension, i.e. in practice the selected value for the mass and for the position of the inertial mass arranged close to the free end of the damper and/or the selected value for the stiffness of the resilient return means of the suspension member, all depend on the flight configuration of the rotorcraft. Specifically, depending on flight situations, e.g. hovering flight, turning flight, level flight, etc., each MGB bar is loaded to a greater or lesser extent, since there is great variation in the torsor of dynamic excitation coming from the rotary dynamic assembly (and comprising the components of the forces and the moments resulting from the aerodynamic and inertial forces during rotation of the rotary dynamic assembly). Thus, optimum adjustment of the SARIB suspension for hovering flight is, a priori, not optimum for cruising flight. It is then necessary to find an adjustment for the SARIB suspension that constitutes the best compromise for limiting the transmission of vibration to the structure regardless of the flight situation.

Adjusting such an antivibration system usually corresponds to a SARIB suspension of passive type. For example, the adjustment may be performed by a set of resilient return members presenting different stiffnesses and/or by modifying the value of the mass of the inertial mass and/or by moving the center of inertia of the damper by moving said inertial mass. This is done by adjustment sequences involving alternating between taking measurements, and assembling and disassembling, thereby leading to numerous adjustment operations.

In order to improve that situation, SARIB suspensions have also been developed that are of the controlled or semi-active type, in particular such as those described by the Applicant in Document FR 2 747 098.

The general principle is to automate the adjustment procedure by means of calculation means that, by using an appropriate algorithm, enable the adjustment of the antivibration system to be self-contained. Under such circumstances, the inertial mass or a portion of the inertial mass arranged close to the free end of the damper can be moved in order to vary the equivalent inertia of the damper as seen at the center of the pivot type connection between the damper and the fuselage of the rotorcraft.

One simple device is to arrange a stepper electric motor on the damper to drive a wormscrew system so as to move all or part of the inertial mass along a longitudinal axis of the damper. Such movement of the inertial mass then takes place between a low position and a high position along the longitudinal axis of the damper.

In known manner, a controlled type SARIB is adjusted by placing one or more accelerometers in the cabin of the rotorcraft in order to measure the resulting vibration representative of levels of vibration of the rotorcraft at a plurality of points.

An overall vibration level criterion is then defined for the rotorcraft. This criterion is usually a function of the root mean square of the amplitudes along a vertical component of the resulting vibrations measured by the accelerometers arranged on the fuselage.

The adjustment method then causes the inertial mass to move away from an initial position, with the inertial masses of the various dampers being moved independently of one another over relatively large distances initially, and then over smaller distances in order subsequently to refine the adjustment.

Thereafter, the effect produced by moving an inertial mass on the variations in the vibratory criterion used is analyzed. Consequently, the movement direction of said inertial mass may optionally be changed, so that it moves down or up along the longitudinal axis of the damper. This stage of adjustment corresponding to moving the inertial mass is repeated until the criterion relating to the vibratory level is satisfied in application of an established rule. Such a rule generally corresponds to going below a predetermined threshold for the level of the mean resulting vibration transmitted to the fuselage of the rotorcraft.

That method is commonly referred to as the "gradient" method, and it is based on minimizing the least squares or root mean square amplitude of the resulting vibration transmitted to the fuselage of the rotorcraft.

Although that adjustment method makes it possible to vary the adjustments of the inertial masses of each of the dampers and to adapt the adjustment as a function of the flight configuration of the rotorcraft, it nevertheless presents numerous drawbacks.

Such an adjustment method takes place very slowly. Specifically, convergence towards an optimum adjustment for the positioning of the moving elements is very random, since changing the state of the criterion that corresponds to synthesizing the magnitudes from all of the accelerometers, itself takes place very slowly. Furthermore, the criterion also fluctuates very slowly, which implies a sequence of changes of putting each of the inertial masses into a well-adjusted and then a poorly-adjusted position along the respective longitudinal axis of each damper in order to end up converging below a certain threshold value.

That method therefore cannot enable the adjustment of a SARIB of the controlled type to be caused to converge quickly in reliable manner. It corresponds rather to a tool for use in design and testing in order to determine parameters for setting a SARIB of passive type for subsequent use on all of the rotorcraft in a fleet.

Furthermore, such a method requires adjusting the positioning of the inertial masses during stages of flight that are fully stabilized, e.g. corresponding to test periods each lasting on average for about thirty seconds. Specifically, that method of adjusting a SARIB converges slowly and the torsor of the mechanical actions produced by the rotary dynamic assembly must remain absolutely constant during that stage in order to avoid disturbing loading conditions and avoid making it impossible to converge on an optimum adjustment for the positioning of the inertial mass.

As mentioned above, those shortcomings mean that that adjustment method is reserved for prior adjustments of antivibration systems or for antivibration systems that can tolerate a long time for obtaining new adjustment values following a change in the configuration of a member of the rotorcraft.

Such controlled or semi-active type antivibration systems using that method of adjustment, cannot be used under any circumstances for "real time" adjustment of an antivibration system to achieve optimum adjustment of the positioning of the inertial mass, and thus adjustment suitable for providing antiresonance in particular during transient stages that are not well stabilized between two stages of flight of the rotorcraft.

BRIEF SUMMARY OF THE INVENTION

An object of the present invention is thus to propose an antivibration system and a method of adjusting the system that makes it possible to overcome the above-mentioned limitations.

The object of the invention is thus to enable the positioning of the respective inertial masses along the longitudinal axes of the various dampers to be adjusted finely and quickly. This adjustment is also reliable and makes it possible at all times to guarantee a good compromise for comfort and fatigue strength, regardless of the stage of flight of the rotorcraft.

Thus, the invention relates to a rotorcraft comprising:
a main rotor serving to provide the rotorcraft with at least lift and possibly also propulsion;

at least one engine for driving the main rotor in rotation relative to a fuselage of the rotorcraft;

a main power transmission gearbox or "MGB" for transmitting rotary motion generated by the engine(s) to the main rotor; and an antivibration system arranged at the interface between the fuselage of the rotorcraft and a casing of the MGB, the antivibration system comprising:

at least one tuned-mass damper comprising:
a rigid structure of elongate shape extending in a longitudinal direction Da-Dd between a first end secured to the fuselage of the rotorcraft by a hinge having at least one degree of freedom to move in rotation about a center O, and a second end that is free;
an inertial mass suitable for moving in translation along a longitudinal axis La-Ld parallel to the longitudinal axis Da-Dd of the rigid structure; and
motor members for controlling movement in translation of the inertial mass along said longitudinal axis La-Ld;

at least one suspension member for the MGB including resilient return means suitable for returning the damper(s) towards a central position, the damper(s) being capable of oscillating back and forth about the central position with rotary motion about the center O;

at least one first accelerometer arranged on the fuselage of the rotorcraft to measure in at least one direction resulting vibration to which the fuselage is subjected;

first input means for receiving measurements of the resulting vibration; and calculation means connected to the first input means to analyze the measurements of the resulting vibration as a function of time.

According to the invention, such a rotorcraft is remarkable in that the antivibration system further comprises:

at least one second accelerometer arranged on the casing of the MGB for measuring in at least one direction the dynamic excitation to which the casing of the MGB is subjected; and second input means for receiving measurements of said dynamic excitation; and in that the calculation means are connected to the input means to analyze the measurements of the dynamic excitation as a function of time, the calculation means serving to calculate a phase angle φ between the dynamic excitation and the resulting vibration, and enabling the motor members to be controlled as a function of the phase angle φ.

In addition, and as already mentioned, each suspension member may include resilient return means providing the necessary stiffness for taking up the static forces passing through the MGB bars. These resilient return means may thus be formed by a blade working in bending that is secured to the damper and that rests at its end on the bottom of the MGB. In other variants, such resilient return means may be constituted by a torsion tube or more simply by a spring loaded in twisting and mounted at the hinge having at least one degree of freedom to move in rotation about the center O between the rigid structure of the damper and the fuselage of the rotorcraft.

Furthermore, the casing of the MGB on which the second accelerometer(s) is/are arranged may present various forms, and in particular may be in the form of an independent casing secured to the engine of the rotorcraft, or indeed a casing forming a one-piece unit together with the casing of the engine.

In addition, the first accelerometer(s) arranged on the fuselage and the second accelerometer(s) arranged on the casing of the MGB serve to measure in particular variations in the amplitude and the frequency of the dynamic excitation and the resulting vibration, or the phaseshift between the dynamic excitation and the resulting vibration.

In other words, such an antivibration system makes it possible in real time to adjust the position of the movable element along the longitudinal axis La-Ld by identifying a phase angle φ between the dynamic excitation and the resulting vibration. In addition, such a phase angle φ may also be represented by a phase of the transfer function using a mathematical model representing the relationship between the dynamic excitation and the resulting vibration. Generally, in order to represent the frequency behavior of a transfer function, it is known to use a so-called "Bode" plot enabling a servo-controlled system to be studied in simplified manner.

The Bode plot of a frequency response system is thus a graphical representation made up of two traces, namely the gain in decibels (dB) of the transfer function and its phase in degrees, which is the argument of the transfer function.

Such a real phase can then be represented and plotted from an asymptotic diagram of the transfer function, which in the present example may correspond to a lowpass filter of order greater than or equal to 2.

The asymptotic diagram representing the real phase or the phase angle φ of such an antivibration system is thus a curve varying from 0° to −180° as a function of the vibration frequency. Thus, in the asymptotic diagram, phase is equal to 0° for frequencies below the antiresonance frequency, then changes suddenly at the antiresonance frequency to reach −90° exactly at that frequency, and subsequently is equal to −180° for frequencies greater than the antiresonance frequency.

This sudden and precise variation in the phase angle (at the antiresonance frequency thus makes it possible to adjust the position of the inertial mass along the longitudinal axis La-Ld for each of the dampers forming a part of the antivibration system of the rotorcraft, and to do so both quickly and reliably.

Advantageously, the motor members may cause the inertial mass to move in translation along the longitudinal axis La-Ld in a first direction in translation when the phase angle φ is greater than a first threshold value φ1, and conversely may cause the inertial mass to move in translation along the longitudinal axis La-Ld in a second direction in translation when the phase angle φ is less than a second threshold value φ2.

In other words, when the value of the phase angle φ is greater than the first threshold value φ1, the inertial mass is moved by the motor members along the longitudinal axis La-Ld in the first direction in translation.

However, if conditions of flight change suddenly, such as a change in atmospheric pressure or a gust of wind, for example, or indeed if the stage of flight of the rotorcraft is changed deliberately by its pilot, then the resulting vibration may change without the inertial mass being moved. Under such circumstances, the value of the phase angle φ may become less than the second threshold value φ2, and the inertial mass is then moved by the motor members along the longitudinal axis La-Ld in the second direction in translation opposite to the first direction so as to become once more greater than the second threshold value φ2.

In practice, the motor members may stop movement in translation of the inertial mass along the longitudinal axis La-Ld when the phase angle φ lies between the first and second threshold values φ1 and φ2.

Thus, if the phase angle φ increases to become greater than the second threshold value φ2, the calculation means serve to stop the motor members. Analogously, if the phase angle φ decreases to become less than the first threshold value φ1, the calculation means serve to stop the motor means.

In an advantageous embodiment of the invention, the first threshold value φ1 may be equal to −90°+α, and the second threshold value φ2 may be equal to −90°−α, where α is an angle lying in the range 1° to 20°, and preferably in the range 5° to 15°.

Such first and second threshold values serve to bracket the antiresonance frequency of a second order lowpass filter for which the phase of the transfer function varies suddenly and is exactly equal to −90°. For example, if α is equal to 10°, the first threshold value φ1 is then −80° and the second threshold value φ2 is then −100°. Such an angle α also serves to give the antivibration system an additional adjustment criterion in order to adapt the speed of convergence on optimum adjustment for the positioning of the inertial masses.

Advantageously, the first accelerometer(s) may be arranged on the fuselage of the rotorcraft in the immediate proximity of a connection plate forming a portion of the hinge having at least one degree of freedom to move in rotation about a center O, the connection plate being secured with a pivot type connection to the first end of the rigid structure of a respective one of the dampers.

In this way, the first accelerometer(s) is/are positioned as close as possible to the source of the resulting vibration transmitted to the fuselage of the rotorcraft by the rotary dynamic assembly. In addition, the connection plate is secured to the fuselage of the rotorcraft with a fixed type connection, e.g. by screw fastening, bolting, or welding, in particular. Such a connection plate may for example have two tabs arranged in parallel with each other and forming a "clevis" mount for the first end of the rigid structure of the damper. The tabs then have passing through them the pin of the pivot type connection between each connection plate and the corresponding damper.

In practice, the first accelerometer(s) may be arranged on the fuselage of the rotorcraft in the proximity of a zone that is subjected to maximum resulting vibration.

Such a zone subjected to maximum resulting vibration may in particular be on the floor of the fuselage in the proximity of a seat for receiving a pilot or a passenger. This zone subjected to maximum resulting vibration may in particular constitute a zone that is critical for the comfort of the occupants of the rotorcraft and also for monitoring the fatigue strength characteristics of mechanical members constituting the engine, the MGB, or indeed the fuselage of such a rotorcraft.

In addition, an antivibration system may include a plurality of dampers, in particular three or four, that may be distributed, optionally symmetrically, relative to an axis of rotation of the main rotor.

In a first embodiment, the calculation means perform independent control of the motor members of four distinct dampers comprising a left front damper, a right front damper, a left rear damper, and a right rear damper, the four dampers being arranged symmetrically about an axis of rotation of the main rotor.

Thus, the positioning of the inertial mass of each damper is then adjusted independently of the others. Since this adjustment is performed independently for each of the dampers of the antivibration system, it may be performed simultaneously on all of the dampers of the antivibration system or indeed one after another. Nevertheless, when the adjustment is performed simultaneously, convergence on the optimum adjustment for the positioning of the inertial masses as obtained by using the calculation means, naturally takes place at a speed that is faster.

In a second embodiment, the calculation means may compare the amplitudes of the measurements of the resulting vibration, and as a function of the comparison can identify a symmetry criterion for controlling the motor members of at least four distinct dampers in respective pairs simultaneously.

Specifically, e.g. during level flight or during hovering flight, the pitching moment transmitted by the rotary dynamic assembly to the fuselage of the rotorcraft is considerable. However, if the antivibration system has two front dampers and two rear dampers arranged symmetrically about the axis of rotation of the main rotor, the positioning of the inertial mass on each of the two dampers at the front or at the rear may be similar.

By analogy, for the rotorcraft following a yaw path, a left/right lateral symmetry criterion may be identified and the positioning of the inertial masses on each of the two left or right dampers may likewise be similar.

Advantageously, the calculation means may control the motor members of four distinct dampers simultaneously in pairs, the dampers comprising a left front damper, a right front damper, a left rear damper, and a right rear damper, the four dampers being arranged symmetrically about an axis of rotation of the main rotor.

Consequently, the positioning of two inertial masses may be adjusted simultaneously on each of the two groups of damper pairs in the antivibration system. However, in order to obtain finer adjustment of the antivibration system, the adjustment may also be performed by performing a first symmetrical adjustment of the positioning of two inertial masses in a first group of damper pairs in the antivibration system in alternation with adjusting the positioning of two inertial masses of a second group of dampers in pairs.

The present invention also provides an adjustment method for adjusting an antivibration system fitted to a rotorcraft as described above, such an adjustment method comprising:

a first analysis step for analyzing the resulting vibration to which the fuselage of the rotorcraft is subjected; and a movement step for moving the inertial mass so as to minimize the resulting vibration.

According to the invention, such an adjustment method is remarkable in that it further comprises:

a second analysis step for analyzing the dynamic excitation to which the casing of the MGB is subjected;

a calculation step for calculating the phase angle φ between the dynamic excitation and the resulting vibration; and a control step for controlling the motor members as a function of the phase angle φ.

In other words, the adjustment method makes it possible to identify the optimum positioning for the inertial masses along the longitudinal axes La-Ld of the dampers on the basis of calculating the phase angle φ between the dynamic excitation and the resulting vibration to which the fuselage of the rotorcraft is subjected.

As mentioned above, the phase angle φ may be calculated on the basis of the phase corresponding to the argument of the transfer function of the servo-control system formed by the above-described antivibration system.

Such a method of adjustment then makes it possible to identify sudden changes of phase in each transfer function of the system and to adapt the positioning of each inertial mass along the respective longitudinal axis La-Ld very quickly as a function of these detected sudden variations.

Advantageously, the control step may cause the inertial mass to move in translation along the longitudinal axis La-Ld in a first direction in translation when the phase angle φ is greater than a first threshold value φ1, and conversely cause the inertial mass to move in translation along the longitudinal axis La-Ld in a second direction in translation when the phase angle φ is less than a second threshold value φ2.

Thus, the step of controlling the motor members makes it possible to change the direction in which the inertial masses are moved as a function of the current phase angle value calculated by the calculation means of the antivibration system. Consequently, the current value of the phase angle φ is compared iteratively with the first and second threshold values using a predetermined comparison algorithm.

In practice, the control step may enable the movement in translation of the inertial mass along the longitudinal axis La-Ld to be stopped when the phase angle φ lies between the first and second threshold values φ1 and φ2.

In this way, the control step serves to hold the inertial mass in a particular position so long as the phase angle (is both less than the first threshold value φ1 and greater than the second threshold value φ2.

In a first implementation, the control step may perform independent control of the motor members of four distinct dampers comprising a left front damper, a right front damper, a left rear damper, and a right rear damper, the four dampers being arranged symmetrically about an axis of rotation of the main rotor.

Specifically, in this way, each of the inertial masses can be moved independently of the others, simultaneously, or alternatively one after another, as a function in particular of the calculation capacity of the calculation means.

In a second implementation, the method may include a comparison step for comparing the amplitudes of the measurements of the resulting vibration and an identification step for identifying a symmetry criterion enabling the motor members to be controlled simultaneously in pairs taken respectively from at least four distinct dampers.

Under such circumstances, the inertial masses of two distinct dampers can then be moved in identical manner, e.g. in the same direction in translation along their respective longitudinal axis La-Ld, as a function of identifying the symmetry criterion.

Advantageously, the control step may control the motor members simultaneously in pairs taken from four distinct dampers comprising a left front damper, a right front damper, a left rear damper, and a right rear damper, the four dampers being arranged symmetrically about an axis of rotation of the main rotor.

As already mentioned, the positioning of an inertial mass can then be adjusted simultaneously on each of the two groups of damper pairs in the antivibration system. In addition, the antivibration system may also be adjusted by alternating between a first symmetrical adjustment of the positioning of two inertial masses of a first group of damper pairs in the antivibration system and a second symmetrical adjustment of the positioning of two inertial masses of a second group of two dampers.

BRIEF DESCRIPTION OF THE DRAWINGS

The invention and its advantages appear in greater detail from the context of the following description of examples given by way of illustration and with reference to the accompanying figures, in which.

Elements present in more than one of the figures may be given the same references in each of them.

DETAILED DESCRIPTION OF THE INVENTION

As mentioned above, the invention relates to the field of rotorcraft and antivibration systems serving firstly to optimize comfort for the crew and any passengers, and secondly to optimize fatigue lifetimes for structures and equipment of the rotorcraft.

Figure 1:
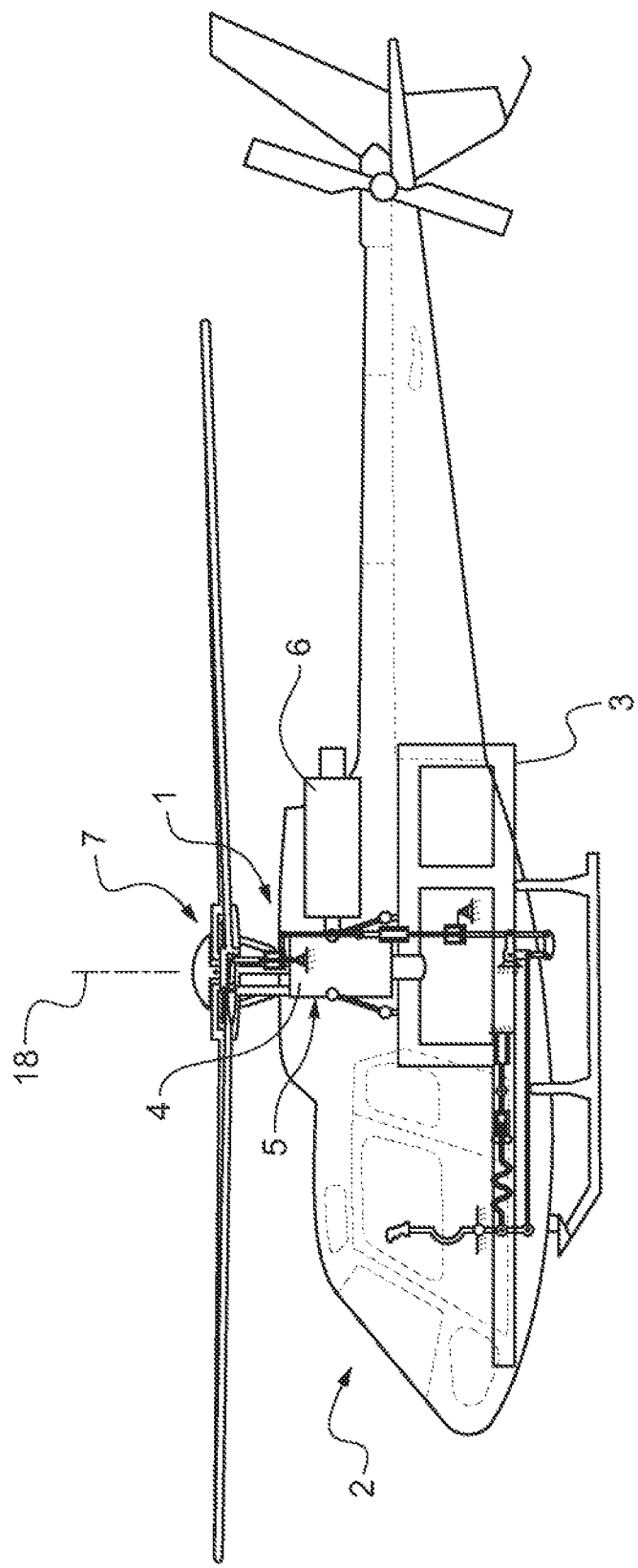
FIG. 1 is a diagrammatic side view in section of a rotorcraft in accordance with the invention.

Thus, as shown in FIG. 1, such a rotorcraft 2 comprises at least one engine 7 connected to a main power transmission gearbox (MGB) 5 serving to transmit rotary motion and drive a main rotor 6 in rotation about an axis of rotation 18. An antivibration system 1 is then arranged at the interface between a casing 4 of the MGB 5 and a fuselage 3 of the rotorcraft 2.

Such an antivibration system 1 then serves to attenuate or even eliminate certain frequencies of the dynamic excitation transmitted by the casing 4 to the fuselage 3 of the rotorcraft 2, in particular during different stages of flight of the rotorcraft 2.

Figure 2:
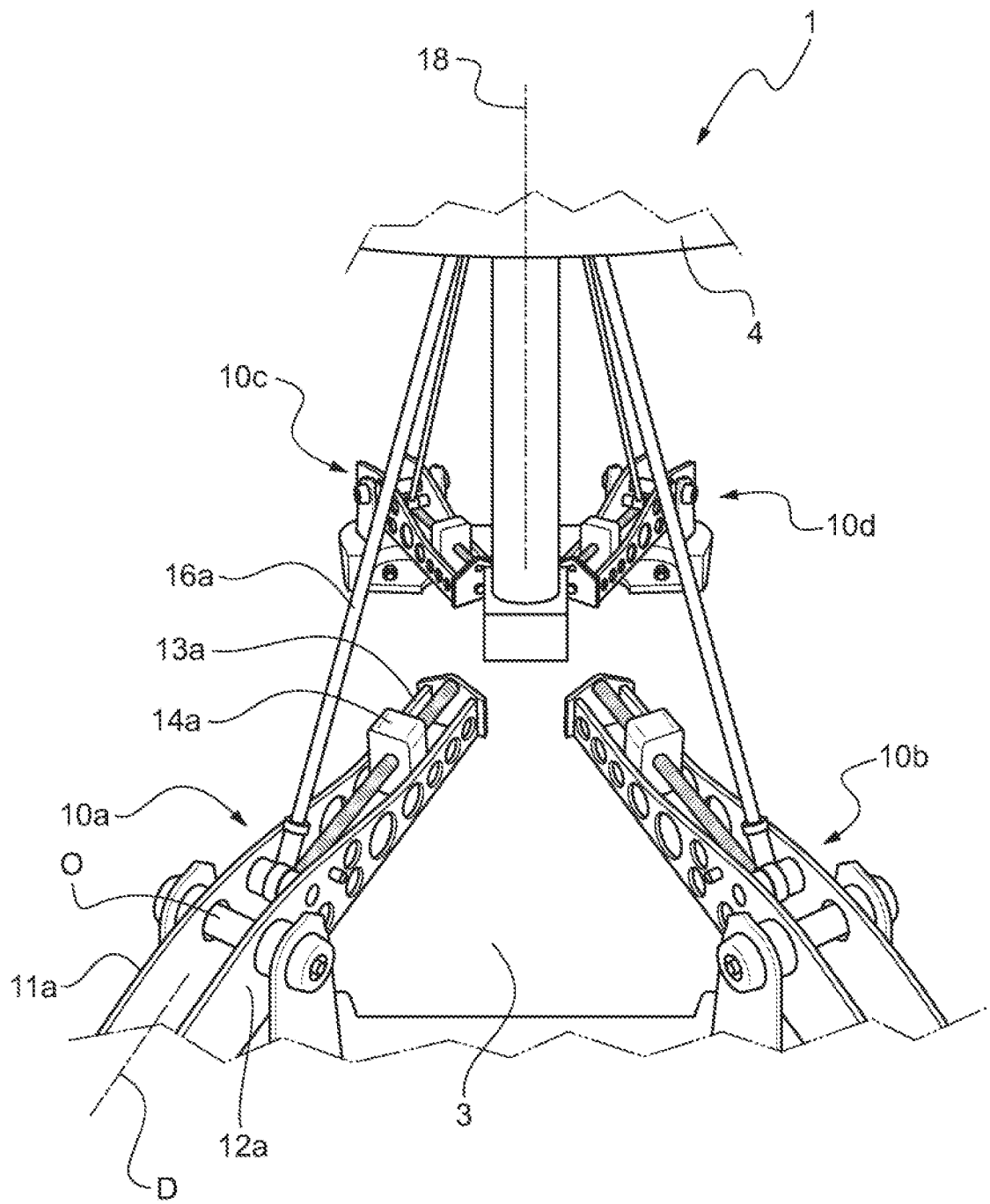
FIG. 2 is a perspective view of an antivibration system in accordance with the invention.

As shown in FIG. 2, such an antivibration system 1 may include a plurality of tuned-mass dampers, e.g. four dampers 10a-10d, i.e. a left front damper 10a, a right front damper 10b, a left rear damper 10c, and a right rear damper 10d. In a particular embodiment, these four dampers 10a-10d may then advantageously be arranged symmetrically about the axis of rotation 18 of the main rotor 7.

Each damper 10a-10d is connected via a respective MGB bar 16a-16d to the casing 4 of the MGB 5, which serves to transmit thereto the dynamic excitation generated by the rotary dynamic assembly comprising in particular the rotor 7 of the rotorcraft 2. Specifically, and as shown, each MGB bar 16a-16d presents an elongate rigid structure having a first end secured to a top portion of the casing 4 of the MGB 5, and a second end secured to a respective damper 10a-10b. The role of the MGB bars is thus to provide all or part of the suspension of the MGB 5 relative to the fuselage 3 of the rotorcraft 2.

Figure 3:
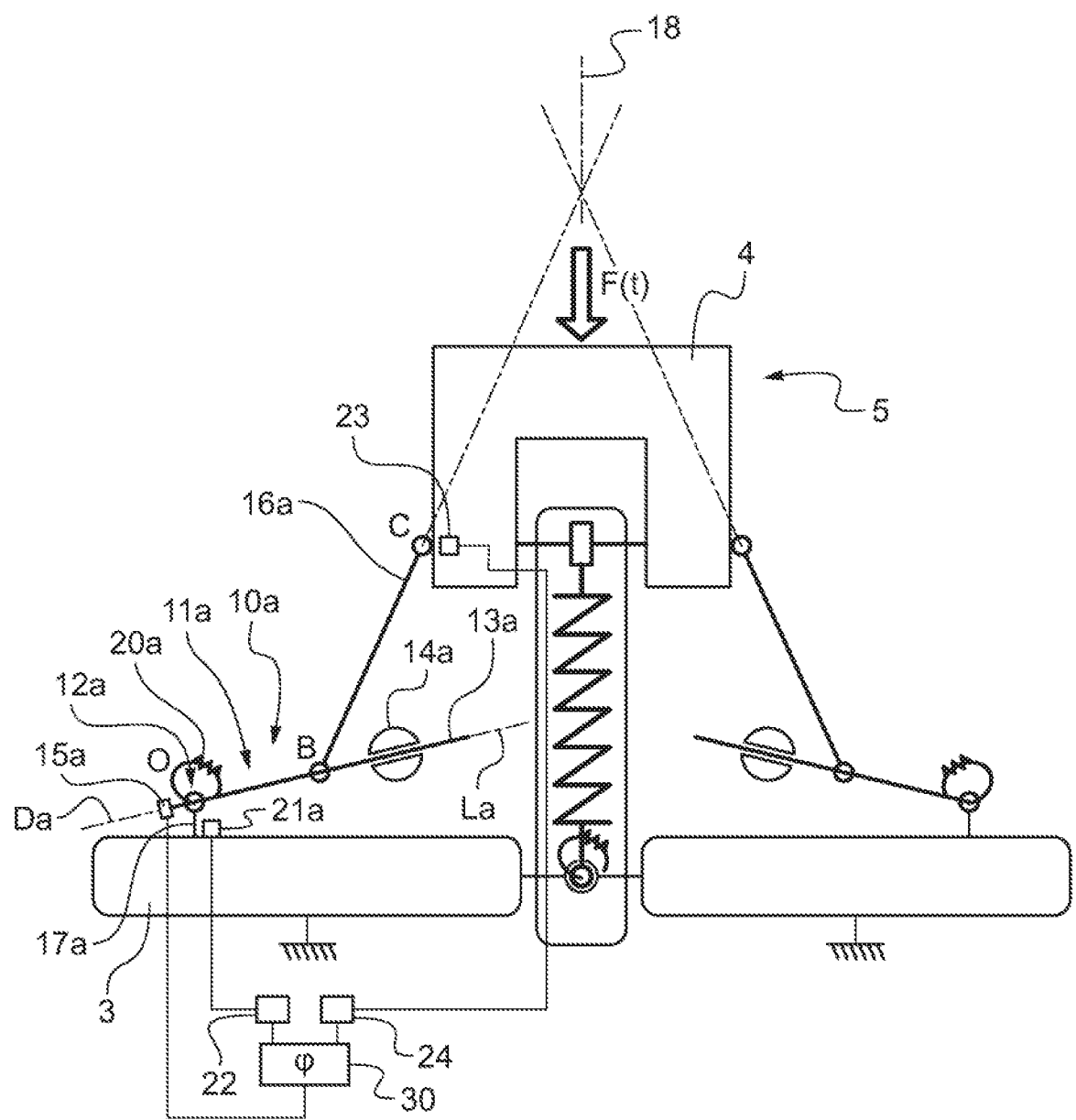
FIG. 3 is a diagrammatic side view of an antivibration system in accordance with the invention.

In FIG. 3, and for greater clarity, each element constituting the various dampers 10a-10d is shown solely for describing the damper 10a, with the component elements of the other dampers 10b-10d naturally being identical. Each damper 10a-10d thus comprises a rigid structure 11a-11d of elongate shape extending along a longitudinal direction Da-Dd between a first end 12a-12d secured to the fuselage 3 of the rotorcraft 2 by a hinge having at least one degree of freedom to move in rotation and of center O, and a second end 13a-13d that is free.

Furthermore, each damper 10a-10d also has an inertial mass 14a-14d suitable for moving in translation along a longitudinal axis La-Ld parallel to the longitudinal direction Da-Dd of the rigid structure 11a-11d.

In addition, motor members 15a-15d serve to control the movement in translation of respective ones of the inertial mass 14a-14d along respective longitudinal axis La-Ld. These motor members 15a-15d in this example are shown as being arranged close to the first end 12a-12d of each rigid structure 11a-11d, however, in other embodiments, they could equally well be arranged close to the free second ends 13a-13d of the rigid structures 11a-11d, or indeed they could be located directly at the inertial masses 14a-14d.

Furthermore, the antivibration system 1 also has at least one suspension member for the MGB 5 that includes resilient return means 20a-20d suitable for returning each of the dampers 10a-10d into its respective central position. The dampers 10a-10d can thus oscillate back and forth about their central positions by movement in rotation about their centers O.

As shown, the resilient return means may be formed by respective springs that are loaded in twisting. Nevertheless, the invention is not limited to this single embodiment that is given by way of way of non-limiting illustration. Specifically, and as mentioned above, in other embodiments of the invention, the resilient return means may equally well be in the form of respective flexible blades, as described in particular in Document FR 2 747 098.

The antivibration system 1 has first accelerometers 21a-21d arranged on the fuselage 3 of the rotorcraft 2 for measuring the resulting vibration to which the fuselage 3 is subjected, along at least one direction. As shown, these first accelerometers 21a-21d are arranged in the immediate proximity of connection plates 17a-17d secured to the fuselage 3 and serving to secure the first end 12a-12d of each rigid structure 11a-11d to the fuselage 3 via a pivot type connection.

These first accelerometers 21a-21d are then connected to first input means 22 for receiving the measurements of the resulting vibration.

Likewise, the antivibration system 1 also has a second accelerometer 23 arranged on the casing 4 of the MGB 5 serving to measure the dynamic excitation to which the casing 4 of the MGB 5 is subjected, in at least one direction.

The second accelerometer 23 is connected to second input means 24 for receiving measurements of the dynamic excitation.

Finally, the antivibration system 1 has calculation means connected both to the first input means 22 for analyzing the measurements of the resulting vibration as a function of time and to the second input means 24 for analyzing the measurements of the dynamic excitation as a function of time.

Such calculation means 30 then serve to calculate a phase angle $\varphi$ between the dynamic excitation and the resulting vibration. The calculation means 30 also include an output connected to the motor means 15a-15d so as to be able to control them as a function of the calculated phase angle $\varphi$.

Figure 4:
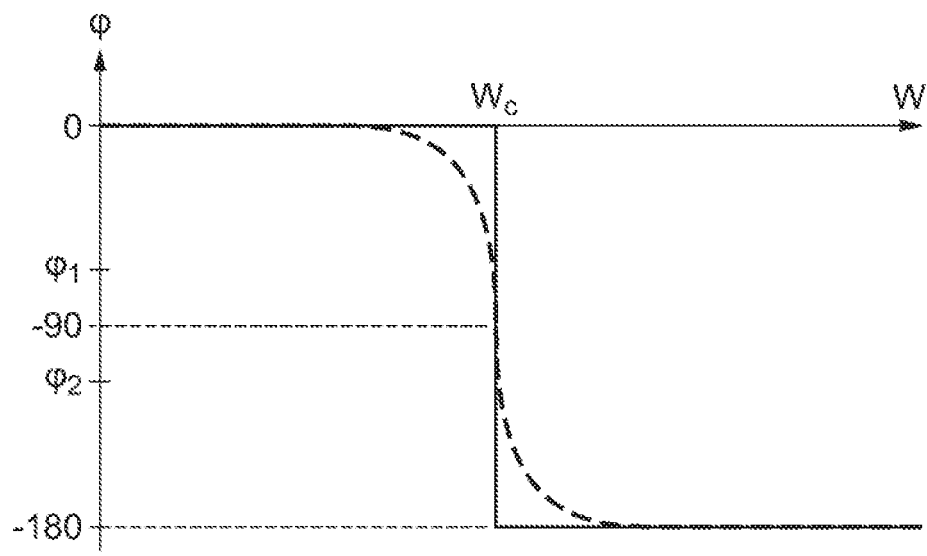
FIG. 4 is a graph plotting variations in phase angle φ as a function of vibration frequency.

As shown in FIG. 4, such a phase angle (varies as a function of the frequency of the dynamic excitation. In addition, an asymptotic diagram plotting the real phase angle $\varphi$ as a function of frequency shows that the antiresonance frequency $\omega c$ changes suddenly from 0° to −180°. The real phase angle $\varphi$ is equal to −90° at the frequency $\omega c$.

Thus, when the real phase angle $\varphi$ lies between a first threshold value $\varphi 1$ and a second threshold value $\varphi 2$, the calculation means 30 can identify that the antivibration system 1 is providing optimum adjustment for minimizing the resulting vibration that is transmitted to the fuselage 3 of the rotorcraft 2.

Nevertheless, if the phase angle $\varphi$ goes above the first threshold value $\varphi 1$ or below the second threshold value $\varphi 2$, the calculation means 30 can identify that the adjustment of the antivibration system 1 is not optimum and can then control the motor members 15a-15d to move one of the inertial masses 14a-14d along a longitudinal axis La-Ld.

Figure 5:
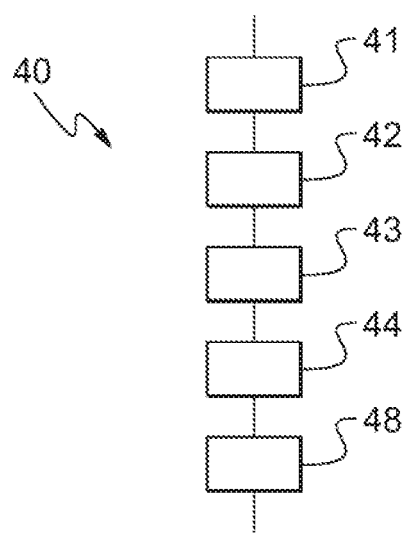
FIGS. 5 and 6 are flow charts showing diagrammatically two implementations of the adjustment method in accordance with the invention.
Figure 6:
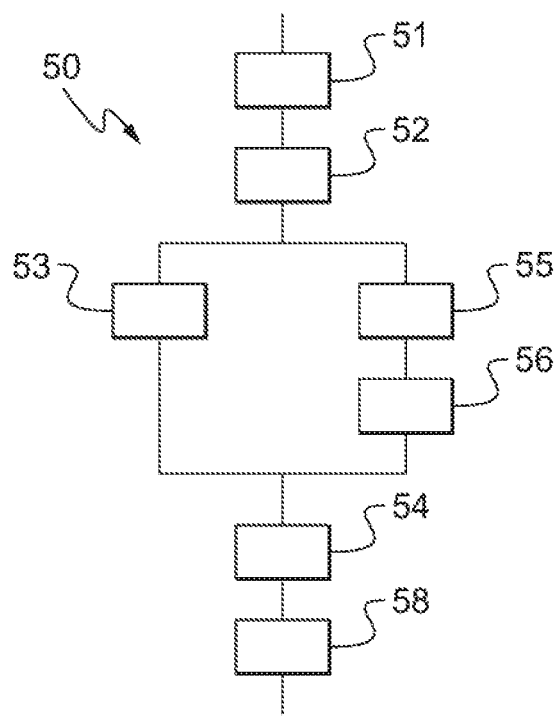

FIGS. 5 and 6 show two variants of the method of adjusting an antivibration system, as described above.

Thus, in a first implementation shown in FIG. 5, such an adjustment method 40 comprises a first analysis step 41 for analyzing the resulting vibrations to which the fuselage 3 of the rotorcraft 2 is subjected.

The adjustment method 40 also has a second analysis step 42 for analyzing the dynamic excitation to which the casing 4 of the MGB 5 is subjected.

Thereafter, the adjustment method 40 then has a calculation step 43 for calculating the phase angle $\varphi$ between the dynamic excitation and the resulting vibration followed by a control step 44 for controlling the motor members 15a-15d as a function of the calculated phase angle $\varphi$.

In this first implementation of the adjustment method 40, the control step 44 can then control the motor members 15a-15d of the four distinct dampers 10a-10d independently, i.e. of the left front damper 10a, of the right front damper 10b, of the left rear damper 10c, and of the right rear damper 10d, it being possible for the four dampers 10a-10d to be arranged symmetrically about an axis of rotation 18 of the main rotor 7.

Thereafter, the adjustment method 40 has a movement step for moving the inertial mass 14a-14d so as to minimize the resulting vibration transmitted to the fuselage 3 of the rotorcraft 2.

In addition, in a second implementation as shown in FIG. 6, such an adjustment method 50 has a first analysis step 51 for analyzing the resulting vibration to which the fuselage 3 of the rotorcraft 2 is subjected.

The adjustment method 50 also has a second analysis step 52 for analyzing the dynamic excitation to which the casing 4 of the MGB 5 is subjected.

The adjustment method 50 then has a calculation step 53 for calculating the phase angle $\varphi$ between the dynamic excitation and the resulting vibration, and a control step 54 for controlling the motor members 15a-15d as a function of the calculated phase angle $\varphi$.

In parallel with the calculation step 53, the adjustment method 50 includes a comparison step 55 for comparing the amplitudes of the measurements of the resulting vibration followed by an identification step 56 for identifying a symmetry criterion enabling the motor members 15a-15d to be controlled in pairs simultaneously.

Thus, in this second implementation of the adjustment method 50, the control step 54 serves to control the motor members 15a-15d of the four distinct dampers 10a-10d simultaneously in pairs, where the dampers comprise the left front damper 10a, the right front damper 10b, the left rear damper 10c, and the right rear damper 10d, the four dampers 10a-10d being arranged symmetrically about an axis of rotation 18 of said main rotor 7.

Finally, the adjustment method 50 includes a movement step for moving the inertial masses 14a-14d so as to minimize the resulting vibration transmitted to the fuselage 3 of the rotorcraft 2.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A rotorcraft comprising:
a main rotor serving to provide the rotorcraft with at least lift and propulsion;
at least one engine for driving the main rotor in rotation relative to a fuselage of the rotorcraft;
a main power transmission gearbox (MGB) for transmitting rotary motion generated by the at least one engine to the main rotor; and
an antivibration system arranged at the interface between the fuselage of the rotorcraft and a casing of the MGB, the antivibration system comprising:
at least one tuned-mass damper comprising:
a rigid structure of elongate shape extending in a longitudinal direction between a first end secured to the fuselage of the rotorcraft by a hinge having at least one degree of freedom to move in rotation about a center, and a second end that is free;
an inertial mass suitable for moving in translation along a longitudinal axis parallel to the longitudinal axis of the rigid structure; and
at least one motor member for controlling movement in translation of the inertial mass along the longitudinal axis;
at least one suspension member for the MGB including resilient return means suitable for returning the at least one tuned-mass damper towards a central position, the at least one tuned-mass damper being capable of oscillating back and forth about the central position with rotary motion about the center;
at least one first accelerometer arranged on the fuselage of the rotorcraft to measure in at least one direction resulting vibration to which the fuselage is subjected; and
a calculator connected to the at least one first accelerometer to analyze the measurements of the resulting vibration as a function of time;
wherein the antivibration system further comprises:
at least one second accelerometer arranged on the casing of the MGB for measuring in at least one direction the dynamic excitation to which the casing of the MGB is subjected; and
wherein the calculator is connected to the at least one second accelerometer to analyze the measurements of the dynamic excitation as a function of time, the calculator serving to calculate a phase angle between the dynamic excitation and the resulting vibration and to control the at least one motor member to cause the inertial mass to move in translation along the longitudinal axis as a function of the phase angle to thereby adjust a position of the inertial mass along the longitudinal axis dependent on the phase angle.

2. The rotorcraft according to claim 1, wherein the at least one motor member cause the inertial mass to move in translation along the longitudinal axis in a first direction in translation when the phase angle is greater than a first threshold value, and conversely cause the inertial mass to move in translation along the longitudinal axis in a second direction in translation when the phase angle is less than a second threshold value.

3. The rotorcraft according to claim 2, wherein the at least one motor member stop movement in translation of the inertial mass along the longitudinal axis when the phase angle lies between the first and second threshold values.

4. The rotorcraft according to claim 2, wherein the first threshold value is equal to $-90°+\alpha$, and the second threshold value is equal to $-90°-\alpha$, where $\alpha$ is an angle lying in the range 1° to 20°.

5. The rotorcraft according to claim 1, wherein the at least one first accelerometer is arranged on the fuselage of the rotorcraft in the immediate proximity of a connection plate forming a portion of the hinge having at least one degree of freedom to move in rotation about a center, the connection plate being capable of pivoting relative to the first end of the rigid structure of the at least one tuned-mass damper.

6. The rotorcraft according to claim 1, wherein the at least one first accelerometer is arranged on the fuselage of the rotorcraft in the proximity of a zone that is subjected to resulting vibration.

7. The rotorcraft according to claim 1, wherein the at least one motor member comprises four motor members and the calculator performs independent control of the motor members of four distinct dampers, the dampers comprising a left front damper, a right front damper, a left rear damper, and a right rear damper, the four dampers being arranged symmetrically about an axis of rotation of the main rotor.

8. The rotorcraft according to claim 1, wherein the at least one motor member comprises four motor members and the calculator compares the amplitudes of the measurements of the resulting vibration, and as a function of the comparison identify a symmetry criterion for controlling the motor members of at least four distinct dampers in respective pairs simultaneously.

9. The rotorcraft according to claim 8, wherein the calculator controls the motor members of four distinct dampers simultaneously in pairs, the dampers comprising a left front damper, a right front damper, a left rear damper, and a right rear damper, the four dampers being arranged symmetrically about an axis of rotation of the main rotor.

10. An adjustment method for adjusting an antivibration system fitted to a rotorcraft, the adjustment method comprising:
providing a rotorcraft including:
a main rotor serving to provide the rotorcraft with at least lift and propulsion;
at least one engine for driving the main rotor in rotation relative to a fuselage of the rotorcraft;
a main power transmission gearbox (MGB) for transmitting rotary motion generated by the at least one engine to the main rotor; and
an antivibration system arranged at the interface between the fuselage of the rotorcraft and a casing of the MGB, the antivibration system including:
at least one tuned-mass damper including:
a rigid structure of elongate shape extending in a longitudinal direction between a first end secured to the fuselage of the rotorcraft by a hinge having at least one degree of freedom to move in rotation about a center, and a second end that is free;
an inertial mass suitable for moving in translation along a longitudinal axis parallel to the longitudinal axis of the rigid structure; and
at least one motor member for controlling movement in translation of the inertial mass along the longitudinal axis;
at least one suspension member for the MGB including resilient return means suitable for returning the at least one tuned-mass damper towards a central position, the at least one tuned-mass damper being capable of oscillating back and forth about the central position with rotary motion about the center;

at least one first accelerometer arranged on the fuselage of the rotorcraft to measure in at least one direction resulting vibration to which the fuselage is subjected; and
a calculator connected to the at least one first accelerometer to analyze the measurements of the resulting vibration as a function of time;
wherein the antivibration system further comprises:
at least one second accelerometer arranged on the casing of the MGB for measuring in at least one direction the dynamic excitation to which the casing of the MGB is subjected; and
wherein the calculator is connected to the at least one second accelerometer to analyze the measurements of the dynamic excitation as a function of time, the calculator serving to calculate a phase angle between the dynamic excitation and the resulting vibration and to control the at least one motor member to cause the inertial mass to move in translation along the longitudinal axis as a function of the phase angle to thereby adjust a position of the inertial mass along the longitudinal axis dependent on the phase angle;
a first analysis step for analyzing the resulting vibration to which the fuselage of the rotorcraft is subjected; and
a movement step for moving the inertial mass so as to minimize the resulting vibration;
wherein the adjustment method further comprises:
a second analysis step for analyzing the dynamic excitation to which the casing of the MGB is subjected;
a calculation step for calculating the phase angle between the dynamic excitation and the resulting vibration; and
a control step for controlling the at least one motor member as a function of the phase angle.

11. The method according to claim 10, wherein the control step causes the inertial mass to move in translation along the longitudinal axis in a first direction in translation when the phase angle is greater than a first threshold value, and conversely causes the inertial mass to move in translation along the longitudinal axis in a second direction in translation when the phase angle is less than a second threshold value.

12. The method according to claim 11, wherein the control step enables the movement in translation of the inertial mass along the longitudinal axis to be stopped when the phase angle lies between the first and second threshold values.

13. The method according to claim 10, wherein the at least one motor member comprises four motor members and the control step controls the motor members independently of four distinct dampers comprising a left front damper, a right front damper, a left rear damper, and a right rear damper, the four dampers being arranged symmetrically about an axis of rotation of the main rotor.

14. The method according to claim 10, wherein the at least one motor member comprises four motor members and the method includes a comparison step for comparing the amplitudes of the measurements of the resulting vibration and an identification step for identifying a symmetry criterion enabling the motor members to be controlled simultaneously in pairs taken respectively from at least four distinct dampers.

15. The method according to claim 14, wherein the control step controls the motor members simultaneously in pairs taken from four distinct dampers comprising a left front damper, a right front damper, a left rear damper, and a right rear damper, the four dampers being arranged symmetrically about an axis of rotation of the main rotor.

16. A rotorcraft comprising:
a main rotor serving to provide the rotorcraft with lift;
an engine for driving the main rotor in rotation relative to a fuselage of the rotorcraft;
a main power transmission gearbox (MGB) for transmitting rotary motion generated by the engine to the main rotor; and
an antivibration system arranged at the interface between the fuselage of the rotorcraft and a casing of the MGB, the antivibration system comprising:
at least one tuned-mass damper comprising:
an elongated rigid structure extending in a longitudinal direction between a first end portion secured to the fuselage of the rotorcraft by a hinge having at least one degree of freedom to move in rotation about a center, and a second end portion that is free;
an inertial mass suitable for moving in translation along an axis parallel to the longitudinal axis of the rigid structure; and
at least one motor member for controlling movement in translation of the inertial mass along the longitudinal axis;
at least one suspension member for the MGB including a resilient return for returning the at least one tuned-mass damper towards a central position, the at least one tuned-mass damper being capable of oscillating about the central position with rotary motion about the center;
at least one first accelerometer arranged on the fuselage of the rotorcraft to measure in at least one direction resulting vibration to which the fuselage is subjected; and
a calculator connected to the at least one first accelerometer to analyze the measurements of the resulting vibration as a function of time;
wherein the antivibration system further comprises:
at least one second accelerometer arranged on the casing of the MGB for measuring in at least one direction the dynamic excitation to which the casing of the MGB is subjected; and
wherein the calculator is connected to the at least one second accelerometer to analyze the measurements of the dynamic excitation as a function of time, the calculator serving to calculate a phase angle between the dynamic excitation and the resulting vibration and to control the at least one motor member to cause the inertial mass to move in translation along the longitudinal axis as a function of the phase angle to thereby adjust a position of the inertial mass along the longitudinal axis dependent on the phase angle.

17. The rotorcraft according to claim 16, wherein the at least one motor member causes the inertial mass to move in translation along the longitudinal axis in a first direction in translation when the phase angle is greater than a first threshold value, and conversely cause the inertial mass to move in translation along the longitudinal axis in a second direction in translation when the phase angle is less than a second threshold value.

18. The rotorcraft according to claim 17, wherein the at least one motor member stops movement in translation of the inertial mass along the longitudinal axis when the phase angle lies between the first and second threshold values.

19. The rotorcraft according to claim 17, wherein the first threshold value is equal to $-90°+\alpha$, and the second threshold value is equal to $-90°-\alpha$, where $\alpha$ is an angle lying in the range 1° to 20°.

20. The rotorcraft according to claim 16, wherein the at least one motor member comprises four motor members and the calculator compares the amplitudes of the measurements of the resulting vibration, and as a function of the comparison identify a symmetry criterion for controlling motor members of at least four distinct dampers in respective pairs simultaneously.

* * * * *